US008331325B2

(12) United States Patent
Wu

(10) Patent No.: US 8,331,325 B2
(45) Date of Patent: *Dec. 11, 2012

(54) DATA PROCESSING METHOD AND DEVICE

(75) Inventor: Wenfu Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/416,983

(22) Filed: Mar. 9, 2012

(65) Prior Publication Data

US 2012/0170551 A1 Jul. 5, 2012

Related U.S. Application Data

(63) Continuation of application No. 12/771,458, filed on Apr. 30, 2010, which is a continuation of application No. PCT/CN2008/072555, filed on Sep. 26, 2008.

(30) Foreign Application Priority Data

Nov. 2, 2007 (CN) .......................... 2007 1 0166088
Sep. 5, 2008 (CN) .......................... 2008 1 0212916

(51) Int. Cl.
*H04W 4/00* (2009.01)
*H04W 36/00* (2009.01)

(52) U.S. Cl. ....................................... 370/331; 455/439

(58) Field of Classification Search ........................ None
See application file for complete search history.

(56) References Cited

U.S. PATENT DOCUMENTS

| 2007/0115885 A1* | 5/2007 | Singh et al. ................... 370/331 |
| 2008/0117884 A1* | 5/2008 | Ishii et al. ...................... 370/338 |
| 2008/0254768 A1* | 10/2008 | Faccin ........................... 455/411 |
| 2008/0316971 A1* | 12/2008 | Shaheen ........................ 370/331 |
| 2009/0061878 A1* | 3/2009 | Fischer .......................... 455/436 |

FOREIGN PATENT DOCUMENTS

| CN | 101001442 A | 7/2007 |
| CN | 101022652 A | 8/2007 |
| CN | 101047967 A | 10/2007 |
| CN | 101047975 A | 10/2007 |
| WO | 2007071112 A1 | 6/2007 |
| WO | 2007092617 A2 | 8/2007 |

OTHER PUBLICATIONS

International Search Report of PCT Patent Application No. PCT/CN2008/072555, mailed Jan. 8, 2009, 6 pages total.

(Continued)

*Primary Examiner* — Eunsook Choi

(57) ABSTRACT

A data processing method is provided for forwarding data in the case of handover between heterogeneous networks. The data processing method includes: when a user equipment (UE) is handed over from an originating network to a target network, receiving, by the originating network, a data forwarding address obtained by the target network; creating a data forwarding tunnel between an originating network gateway and a target network gateway according to the data forwarding address; and forwarding data to the target network through the data forwarding tunnel. A data processing device is also provided. The lossless data processing solution can overcome the problem of data loss in the case of handover between heterogeneous networks in the existing technology, reduces the time of user service interruption and enhances the user experience.

24 Claims, 12 Drawing Sheets

OTHER PUBLICATIONS

First Office Action of Chinese Patent Application No. CN200810212916.8, mailed Sep. 4, 2009 and the English translation thereof, 8 pages total.
Corrected Written Opinion of PCT Patent Application No. PCT/CN2008072555, mailed Dec. 23, 2008, 4 pages total.
Second Office Action of Chinese Patent Application No. CN200810212916.8, mailed Nov. 20, 2009, and an English translation thereof, 8 pages total.
3GPP TS 23.060 V7.5.0, 3rd Generation Partnership Project; Technical Specification Group Services and System Aspects; General Packet Radio Service (GPRS); Service description; Stage 2 (Release 7), 3GPP, dated Sep. 2007, 216 pages total.
3GPP TS 23.401 V1.3.0, 3rd Generation Partnership Project; Technical Specification Group Services and System Aspects; GPRS enhancements for E-UTRAN access (Release 8), 3GPP, dated Oct. 2007, 136 pages total.
3GPP TS 23.402 V1.4.0, 3rd Generation Partnership Project; Technical Specification Group Services and System Aspects; Architecture Enhancements for non-3GPP accesses (Release 8), 3GPP, dated Oct. 2007, 125 pages total.
3GPP TS 29.213 V7.2.0, 3rd Generation Partnership Project;Technical Specification Group Core Network and Terminals;Policy and Charging Control signalling flows and QoS parameter mapping; (Release 7), 3GPP, dated Sep. 2007, 60 pages total.
Cover page of corresponding Chinese Patent No. 101472314B (Patent Application No. CN200810212916.8), citing prior art at Section (56), 1 page total.

* cited by examiner

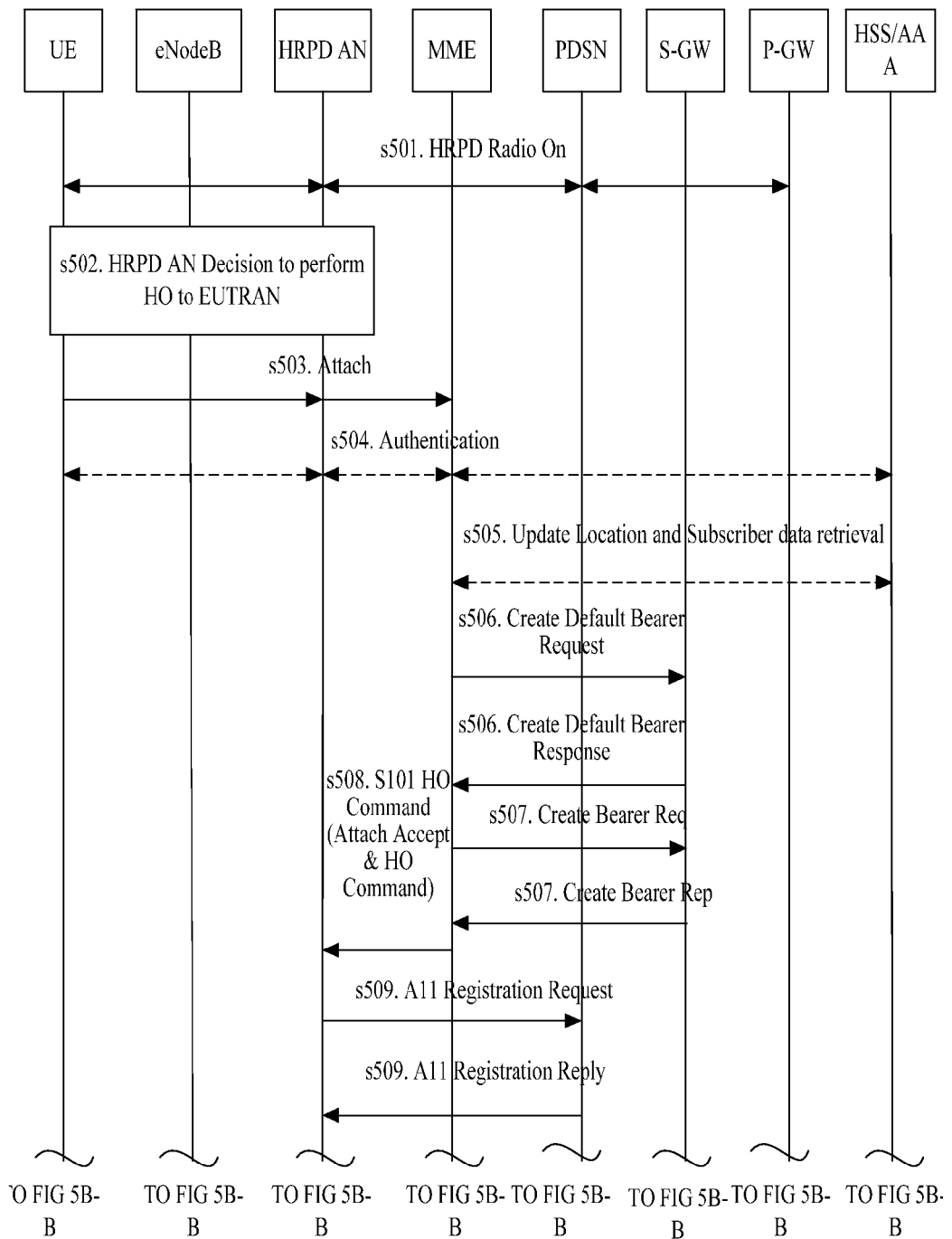
FIG 5B-A

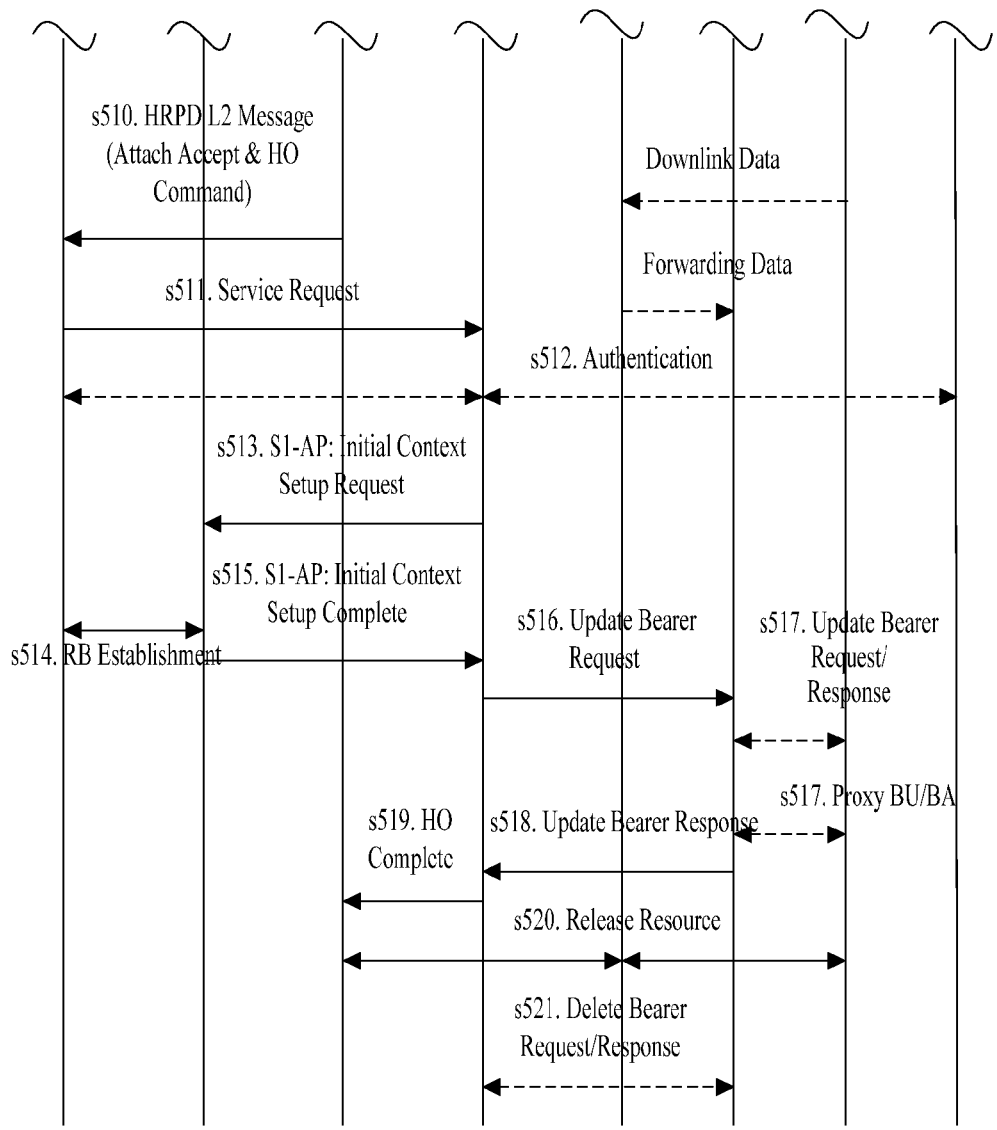
FIG 5B-B

DATA PROCESSING METHOD AND DEVICE

CROSS-REFERENCE TO RELATED APPLICATIONS

This application is a continuation of U.S. patent application Ser. No. 12/771,458, filed on Apr. 30, 2010, which is a continuation of International Application No. PCT/CN2008/072555, filed on Sep. 26, 2008. The International Application claims priorities to Chinese Patent Application No. 200710166088.4, filed on Nov. 2, 2007 and Chinese Patent Application No. 200810212916.8, filed on Sep. 5, 2008. The afore-mentioned patent applications are hereby incorporated by reference in their entireties.

FIELD OF THE INVENTION

The present invention relates to a network technology, and in particular, to a data processing method and device.

BACKGROUND OF THE INVENTION

To enhance the competitiveness of networks in the future, the 3rd Generation Partnership Project (3GPP) is studying a brand-new evolved network. As shown in FIG. 1, the system architecture of the evolved network includes: an evolved UMTS terrestrial radio access network (E-UTRAN), adapted to implement the radio access functions in the evolved network; a mobility management entity (MME), responsible for mobility management of the control plane, such as user context and mobile status management and allocation of temporary user IDs; a serving gateway (serving GW), which is the user plane anchor point between the 3GPP access networks and also the interface for receiving the E-TURAN; and a packet data network gateway (PDN GW), which is the user plane anchor point between a 3GPP access network and a non-3GPP access network and also the interface for receiving the connection with external PDNs. A policy and charging rules function (PCRF) is adapted to make a policy control decision and exercise traffic charging control. A home subscriber server (HSS) is adapted to store subscription information of users.

A UMTS terrestrial radio access network (UTRAN) and a GSM/EDGE radio access network (GERAN) are adapted to implement the radio access functions in the current GPRS/UMTS network. A serving GPRS support node (SGSN) is adapted to implement functions in the GPRS/UMTS network, such as routing and forwarding, mobility management, session management, and user information storage.

Non-3GPP IP access networks are defined by some non-3GPP organizations. Such networks include a wireless local area network (WLAN), a worldwide interoperability for microwave access (WIMAX) network, and a code division multiple access (CDMA) network. The non-3GPP IP access networks are connected to a PDN GW and an authentication, authorization and accounting (AAA) server, where the AAA server is adapted to implement access authentication, authorization and accounting functions for a user equipment (UE).

FIG. 2 shows an architecture of a system for optimizing handover between a 3GPP network and a high rate packet data (HRPD) network (a CDMA network). An S101 interface is added between an MME and an HRPD access network (HRPD AN) for transmitting signaling messages between the MME and the HRPD AN. A packet data serving node (PDSN) is a user plane processing network element (NE) in the HRPD network, and is adapted to perform user plane processing in the HRPD network.

In the existing technology, a scenario where a UE is handed over between heterogeneous networks may occur. For example, the UE in the HRPD access network is handed over to an E-UTRAN access network.

During the implementation of the present invention, the inventor discovers the following problem in the existing technology: The process of handover between heterogeneous networks in the existing technology, for example, handover between the HRPD network and the E-UTRAN network, does not consider the data lossless processing method, causing a large amount of data loss during the handover process. As a result, the user service is interrupted for a long time and even the user service is completely interrupted, which affects user experiences.

SUMMARY OF THE INVENTION

Embodiments of the present invention provide a data processing method and device to implement lossless data transmission during the process of handover between heterogeneous networks.

To achieve the above objective, an embodiment of the present invention provides a data processing method. The method includes:

when a user equipment (UE) is handed over from a source network to a target network, receiving, by the source network, a data forwarding address obtained by the target network;

creating a data forwarding tunnel between a source network gateway and a target network gateway according to the data forwarding address; and forwarding data to the target network through the data forwarding tunnel Another embodiment of the present invention provides a data processing method. The method includes:

when a UE is handed over from a source network to a target network, notifying, by a target network gateway, a user plane anchor point NE of the target network and the source network of bi-casting; and sending, by the user plane anchor point NE, data to the source network and the target network at the same time according to the notification.

An embodiment of the present invention provides a data processing device of a target network. The data processing device includes:

a handover source entity, adapted to: notify a target network gateway of creating data forwarding resources when detecting that a UE is handed over to the target network, receive a data forwarding address sent from the target network gateway, and send the forwarding address to an source network; and the target network gateway, adapted to: receive the notification from the handover source entity, create data forwarding resources, and send the data forwarding address to the handover source entity.

An embodiment of the present invention provides a data processing device of a source network. The data processing device includes:

a handover processing entity, adapted to: obtain a data forwarding address that a target network obtains when a UE is handed over to the target network, and send the data forwarding address to a source network gateway; and the source network gateway, adapted to: create a data forwarding tunnel with a target network gateway according to the data forwarding address, and send data to the target network through the data forwarding tunnel Another embodiment of the present invention provides a data processing device of a target network. The data processing device includes:

a handover source entity, adapted to notify a target network gateway of bi-casting when detecting that a UE is handed over from a source network to the target network; and the target network gateway, adapted to: receive the notification message, send the notification message to a user plane anchor point NE of the target network and the source network, and receive data sent from the user plane anchor point NE.

Compared with the existing technology, embodiments of the present invention have the following merits:

Embodiments of the present invention provide a data processing method applicable to the process of handover between heterogeneous networks. Through data forwarding or simultaneous data transmission on the source network and the target network, the data processing method overcomes the problem of data loss during the process of handover between heterogeneous networks in the existing technology, reduces the duration of user service interruption and enhances the user experience.

BRIEF DESCRIPTION OF THE DRAWINGS

FIGS. 5B-A and 5B-B show a signaling process of handover from an HRPD network to an E-UTRAN through the data forwarding method provided in the second embodiment of the present invention;

DETAILED DESCRIPTION OF THE EMBODIMENTS

Embodiments of the present invention are hereinafter described in detail with reference to the accompanying drawings and exemplary embodiments.

A data processing method provided in the first embodiment of the present invention is used for data forwarding in the case of handover between heterogeneous networks. The method may implement lossless data forwarding during the network handover by establishing a data forwarding tunnel between a source network and a target network where the UE is handed over or sending data at the same time (bi-casting) in the source network and the target network. The heterogeneous networks include a 3GPP network and a non-3GPP network or include hybrid-networked non-3GPP networks, for example, hybrid-networked CDMA network and WIMAX network.

Figure 1:
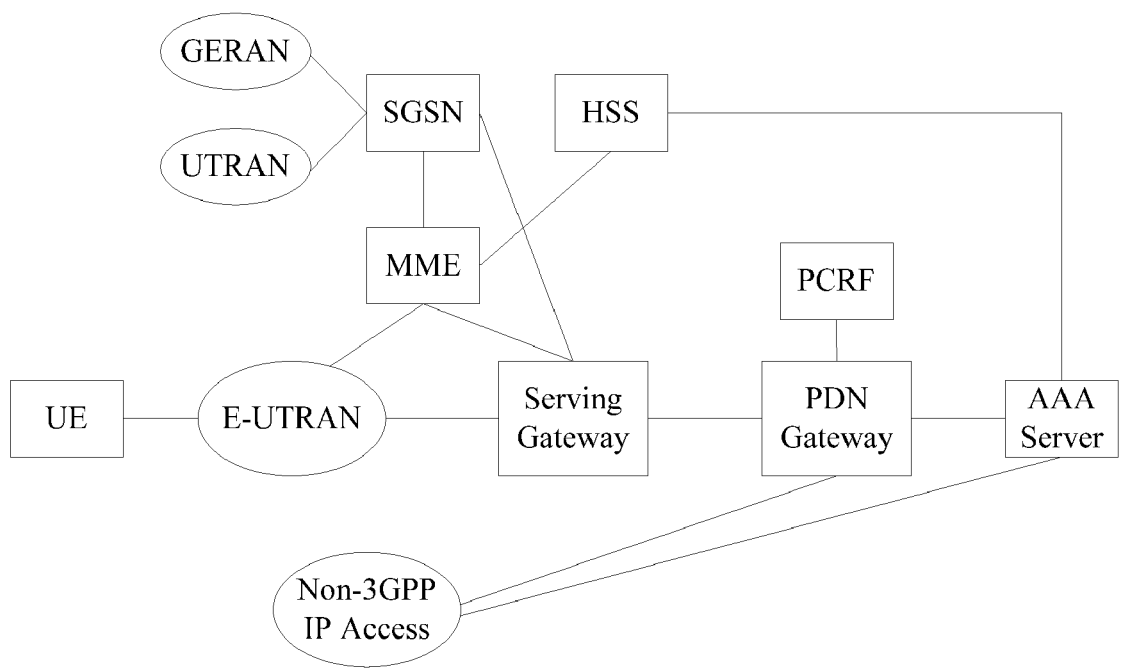
FIG. 1 shows an architecture of an evolved network.
Figure 2:
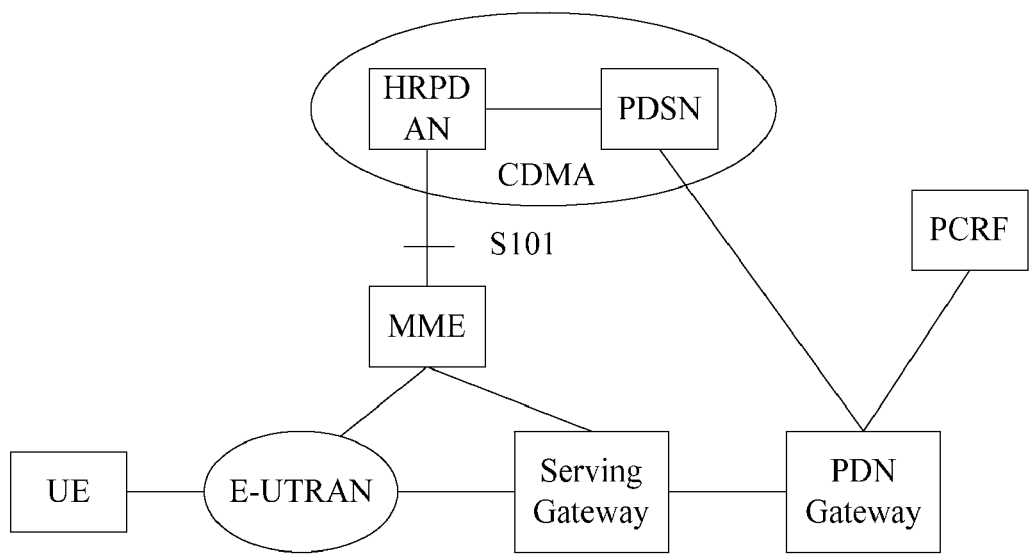
FIG. 2 shows a structure of a system for optimizing handover between a 3GPP network and an HRPD network in a CDMA network.
Figure 3:
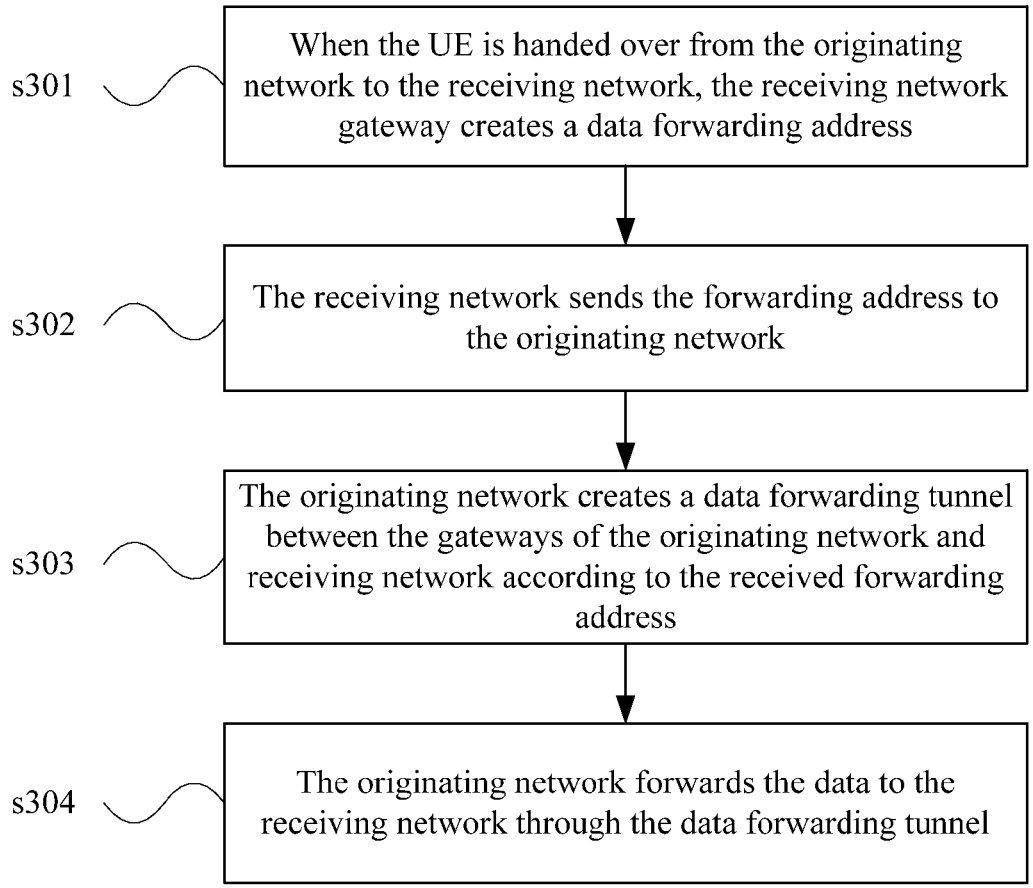
FIG. 3 is a flowchart of a data processing method provided in a first embodiment of the present invention.

As shown in FIG. 3, when using the method of establishing a data forwarding tunnel, a data processing method provided in the first embodiment of the present invention includes the following steps:

S301: When the UE is handed over from the source network to the target network, the target network gateway creates a data forwarding address.

S302: The target network sends the forwarding address to the source network.

S303: The source network creates a data forwarding tunnel between the gateways of the source network and target network according to the received forwarding address.

S304: The source network forwards the data to the target network through the data forwarding tunnel For the data forwarding in the case of handover between heterogeneous networks with a single access point name (APN) and multiple PDN connections, S302 is as follows: The target network sends the data forwarding address and PDN connection information to the source network.

The PDN connection information may include one of the following aspects:

(1) PDN connection ID. The PDN connection ID is used to identify each PDN connection of the UE.

(2) APN and PDN connection ID. The APN and PDN connection ID are used to identify each PDN connection of the UE.

(3) APN+sequence number. The APN and sequence number are used to identify each PDN connection of the UE. For example, the first PDN connection of the UE is identified by APN:1; the second PDN connection of the UE is identified by APN:2; and the rest can be inferred in the same manner.

S303 is as follows: The source network creates a data forwarding tunnel between the gateways of the source network and target network according to the received data forwarding address and PDN connection information.

Figure 4:
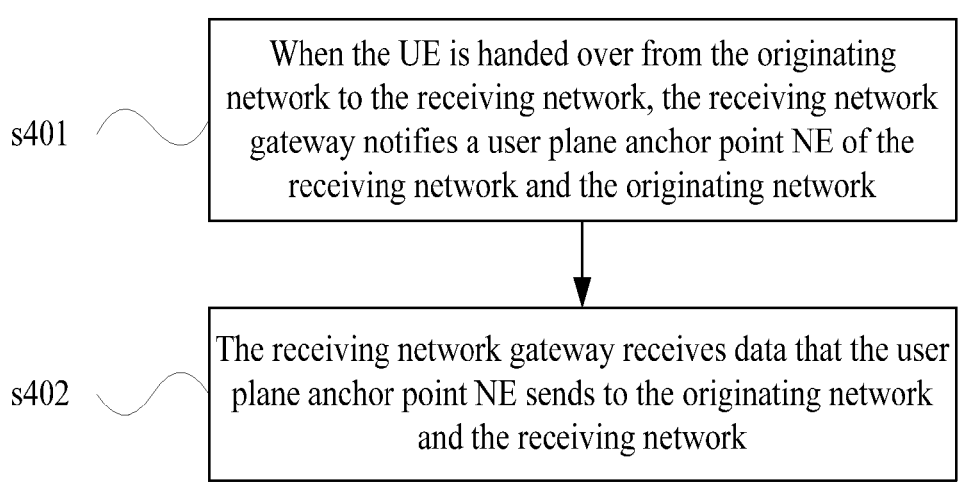
FIG. 4 is a flowchart of another data processing method provided in the first embodiment of the present invention.

As shown in FIG. 4, when using the bi-casting method, a data processing method provided in an embodiment of the present invention includes the following steps:

S401: When the UE is handed over from the source network to the target network, the target network gateway notifies a user plane anchor point NE of the target network and the source network.

S402: The target network gateway receives data that the user plane anchor point NE sends to the source network and the target network.

Supposing the UE is handed over between an HRPD network and an E-UTRAN, the following describes embodiments of the present invention with reference to specific scenarios.

Figure 5A:
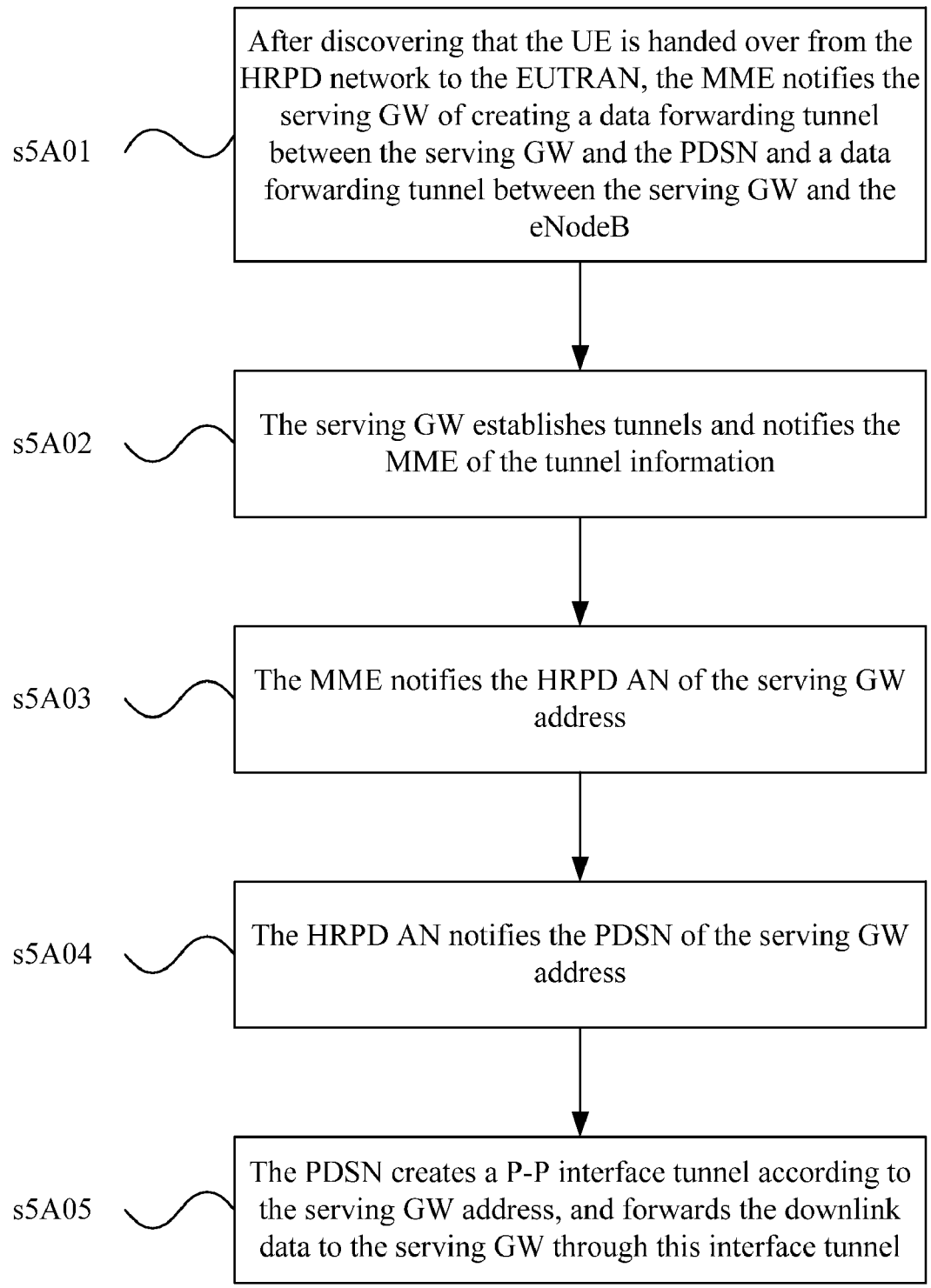
FIG. 5A shows a process of handover from an HRPD network to an E-UTRAN through a data forwarding method provided in a second embodiment of the present invention.

The process of handover from an HRPD network to an E-UTRAN through a data forwarding method is described in the second embodiment of the present invention. Herein, when the target network is an E-UTRAN and the source network is an HRPD network, the first NE of the target network is an MME and the second NE of the target network is an S-GW, while the first NE of the source network is an HRPD AN and the second NE of the source network is a PDSN. As shown in FIG. 5A, the process includes the following steps:

S5A01: After discovering that the UE is handed over from the HRPD network to the E-UTRAN, the MME notifies the serving GW of creating data forwarding resources between the HRPD network and the E-UTRAN (including a data forwarding tunnel between the serving GW and the PDSN, and a data forwarding tunnel between the serving GW and an eNodeB).

S5A02: The serving GW establishes tunnel and notifies the MME of the tunnel information.

S5A03: The MME notifies the HRPD AN of the serving GW address.

S5A04: The HRPD AN notifies the PDSN of the serving GW address.

S5A05: The PDSN creates data forwarding resources (P-P interface tunnel) between the PDSN and the serving GW according to the serving GW address, and sends downlink data to the serving GW through the interface tunnel.

For the data forwarding in the case of handover between heterogeneous networks with a single APN and multiple PDN connections, S5A03 is as follows: The MME notifies the HRPD AN of the serving GW address and PDN connection information.

S5A04 is as follows: The HRPD AN notifies the PDSN of the serving GW address and PDN connection information.

S5A05 is as follows: The PDSN creates data forwarding resources (P-P interface tunnel) between the PDSN and the serving GW according to the serving GW address and PDN connection information. That is, for each PDN connection, the PDSN creates a generic routing encapsulation (GRE) tunnel between the PDSN and the serving GW; the PDSN forwards downlink data in the PDN connection to the serving GW through the GRE tunnel The handover signaling process associated with the preceding process in the networking scenario is shown in FIG. 5B, and includes the following steps:

S501: The UE accesses the HRPD network.

S502: The UE or HRPD AN determines to perform handover from the HRPD network to the E-UTRAN.

S503: The UE sends an Attach Request message to the MME through the HRPD network.

S504: Authentication is performed.

S505: The MME sends an Update Location message to the HSS, and obtains the subscription data of the UE. The HSS returns the subscription data to the UE, where the subscription data includes address information of the PDN GW used by the UE.

S506: The MME selects a serving GW, and sends a Create Default Bearer Request message to the serving GW. The serving GW returns a Create Default Bearer Response message to the MME.

S507: If the MME discovers that the UE is handed over from the HRPD network to the E-UTRAN, the MME chooses the serving GW that the UE is using or selects a serving GW that can forward data between the E-UTRAN and the HRPD network. Then, the MME notifies the selected serving GW of creating data forwarding resources between the HRPD network and the E-UTRAN. This may be performed as follows:

1. The MME sends a Create Bearer Request message to the serving GW. The MME adds an indication information element to the message to notify the serving GW of creating data forwarding resources between the HRPD network and the E-UTRAN. The indication information element may include:
   HRPD to E-UTRAN handover indication.
   Handover type: The MME sets this information element to "HRPD to E-UTRAN Handover".
   Data forwarding type: The MME sets this information element to "HRPD to E-UTRAN Data Forwarding".
   Cause: The MME sets this information element to "HRPD to E-UTRAN Handover".

2. The MME sends a specific message, for example, Create Data Forwarding Tunnel Request, to notify the serving GW of creating data forwarding resources between the HRPD network and the E-UTRAN.

After receiving the message, the serving GW creates data forwarding resources between the serving GW and the PDSN (P-P interface tunnel) and between the serving GW and the eNodeB (GTP-U tunnel). Then, the serving GW returns a Create Bearer Response (serving GW address) message to the MME. The serving GW address is the data forwarding address of the serving GW, and the PDSN forwards downlink packets to a serving GW associated with the serving GW address.

The serving GW may start a timer, and release created data forwarding resources after the timer times out.

S508: The MME sends an S101 HO Command message to the HRPD AN, where the message includes an Attach Accept message, an HO Command message, and a serving GW address.

S509: If the HRPD AN discovers that the UE is handed over from the HRPD network to the E-UTRAN, the HRPD AN notifies the PDSN of creating data forwarding resources between the HRPD and the E-UTRAN. This may be performed as follows:

1. The HRPD AN sends an All-Registration Request message to the PDSN. The HRPD AN adds an indication information element to the message to notify the PDSN of creating data forwarding resources between the HRPD network and the E-UTRAN. The indication information element may include:
   HRPD to E-UTRAN handover indication.
   Handover type: The HRPD sets this information element to "HRPD to E-UTRAN Handover".
   Data forwarding type: The HRPD AN sets this information element to "HRPD to E-UTRAN Data Forwarding".
   Cause: The HRPD AN sets this information element to "HRPD to E-UTRAN Handover".
   The HRPD AN sets an "S" flag bit in the Flag information element to "True" or "1" to notify the PDSN that the cause is "PDSN fast handoff".

2. The HRPD AN sends a specific message, for example, All-Create Data Forwarding Tunnel Request, to notify the PDSN of creating data forwarding resources between the HRPD network and the E-UTRAN.

The notification message sent by the HRPD AN carries the serving GW address that the HRPD AN receives from the MME. After receiving the message, the PDSN creates data forwarding resources (P-P connection (PDSN address, serving GW address)) between the PDSN and the serving GW. The PDSN returns an All-Registration Reply message to the HRPD AN. The serving GW may start a timer, and release created P-P connection resources after the timer times out.

After receiving downlink data from the PDN GW, the PDSN forwards the downlink packets to the serving GW through the established P-P connection. For the PDSN, the P-P interface uses a GRE protocol; the interface between the serving GW and the eNodeB uses a GPRS tunneling protocol. The forwarded packets that the serving GW receives from the PDSN are in GRE format. Thus, the serving GW needs to convert the formats of the forwarded packets from GRE into GTP. If no resources are available in the eNodeB, the serving GW caches the converted forwarded packets. If resources are already available in the eNodeB, the serving GW sends the converted forwarded packets to the eNodeB.

S510: The HRPD AN sends an HRPD AN L2 message to the UE, where the message includes an Attach Accept message and an HO Command message.

S511: The UE is handed over to the E-UTRAN, and sends a Service Request message to the MME.

S512: Authentication may be performed.

S513: The MME sends an S1-AP:Initial Context Setup Request message to the eNodeB.

S514: The eNodeB initiates a radio bearer (RB) setup process.

S515: The eNodeB returns an S1-AP:Initial Context Setup Complete message to the MME.

S516: The MME sends an Update Bearer Request message to the serving GW.

S517: If the interface between the serving GW and the PDN GW uses the GTP protocol, the serving GW sends an Update Bearer Request message to the PDN GW, and the PDN GW returns an Update Bearer Response message to the serving GW. If the interface between the serving GW and the PDN GW uses a Proxy Mobile IP (PMIP) protocol, the serving GW sends a Proxy BU message to the PDN GW, and the PDN GW returns a Proxy BA message to the serving GW.

S518: The Serving GW returns an Update Bearer Response message to the MME.

S519: The MME sends an HO Complete message to the HRPD AN to notify the HRPD AN of the completion of the handover.

S520: The PDN GW initiates a release process at the source HRPD network.

S521: After receiving the HO Complete message, the MME may initiate a "Delete Bearer Request" process to notify the serving GW of deleting created forwarding tunnel resources.

For the data forwarding in the case of handover between heterogeneous networks with a single APN and multiple PDN connections, S508 is as follows: The MME sends an S101 HO Command message to the HRPD AN, where the message includes an Attach Accept message, an HO Command message, a serving GW address, and PDN connection information.

S509 is as follows: If the HRPD AN discovers that the UE is handed over from the HRPD network to the E-UTRAN, that is, if the HRPD AN receives the HO Command message from the MME, the HRPD AN notifies the PDSN of creating data forwarding resources between the HRPD network and the E-UTRAN. The notification message sent by the HRPD AN carries the serving GW address and PDN connection information that the HRPD AN receives from the MME. After receiving the preceding notification, the PDSN creates data forwarding resources between the PDSN and the serving GW. That is, for each PDN connection, the PDSN creates a GRE tunnel between the PDSN and the serving GW.

Figure 6A:
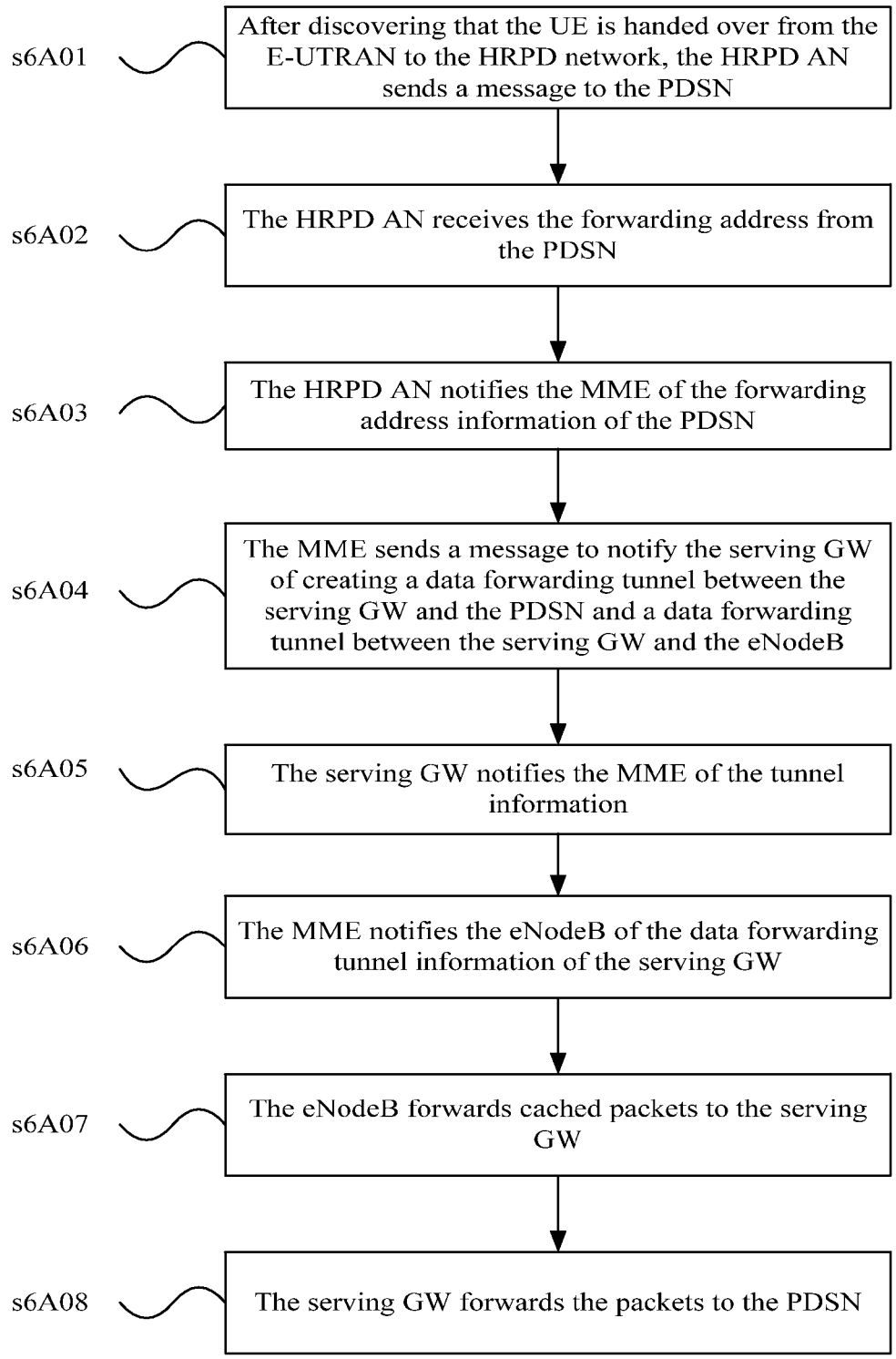
FIG. 6A shows a process of handover from an E-UTRAN to an HRPD network through the data forwarding method provided in the second embodiment of the present invention.

The process of handover from an E-UTRAN to an HRPD network through a data forwarding method is also described in the second embodiment of the present invention. Herein, when the target network is an HRPD network and the source network is an E-UTRAN, the first NE of the target network is an HRPD AN and the second NE of the target network is a PDSN, while the first NE of the source network is an MME and the second NE of the source network is an S-GW. As shown in FIG. 6A, the process includes the following steps:

S6A01: After discovering that the UE is being handed over from the E-UTRAN to the HRPD network, an HRPD AN sends a message to a PDSN.

S6A02: The HRPD AN receives a forwarding address (also called an anchor P-P address) from the PDSN.

S6A03: The HRPD AN notifies an MME of the forwarding address of the PDSN.

S6A04: The MME sends a message to notify a serving GW of creating data forwarding resources between the HRPD network and the E-UTRAN (including a data forwarding tunnel between the serving GW and the PDSN and a data forwarding tunnel between the serving GW and an eNodeB).

S6A05: The serving GW notifies the MME of the tunnel information.

S6A06: The MME notifies the eNodeB of data forwarding tunnel information of the serving GW.

S6A07: The eNodeB forwards cached packets to the serving GW.

S6A08: The serving GW forwards the packets the PDSN.

Note: For the data forwarding in the case of handover between heterogeneous networks with a single APN and multiple PDN connections, S6A03 is as follows: The HRPD AN notifies the MME of the forwarding address of the PDSN and PDN connection information.

Figure 6B:
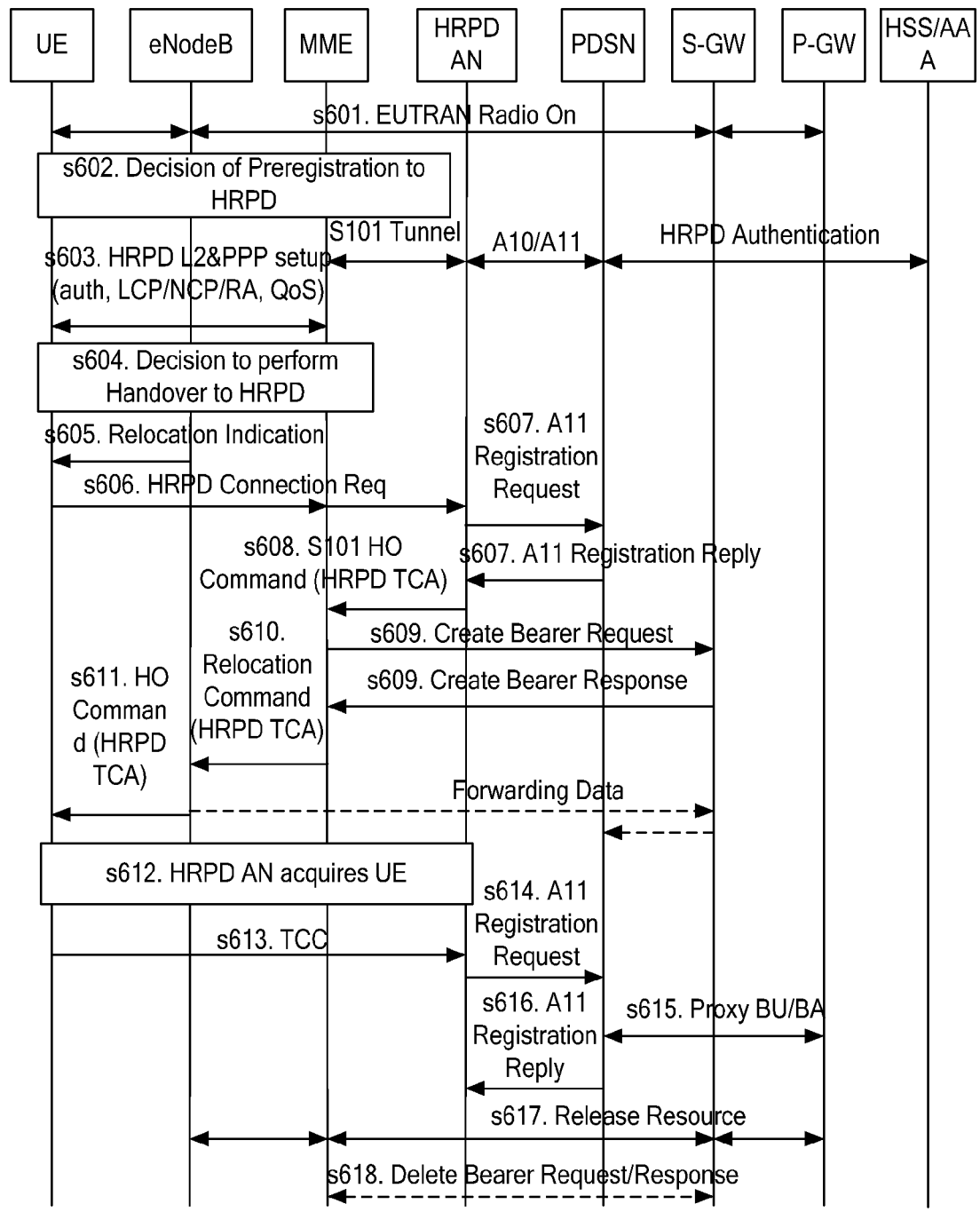
FIG. 6B shows a signaling process of handover from an E-UTRAN to an HRPD network through the data forwarding method provided in the second embodiment of the present invention.

The handover signaling process associated with the preceding process in the networking scenario is shown in FIG. 6B, and includes the following steps:

S601: The UE accesses the E-UTRAN.

S602: The UE or eNodeB determines to pre-register with the HRPD network.

S603: The UE executes a particular program in the HRPD AN to establish an IP service connection with a PDSN and perform authentication in the HRPD AN.

S604: The UE or eNodeB determines to perform handover from the E-UTRAN to the HRPD network.

S605: The eNodeB sends a Relocation Indication message to the UE to notify the UE of handover.

S606: The UE sends an HRPD Connection Request message to the HRPD AN. The HRPD AN allocates radio resources, and activates a PDSN session.

S607: If the HRPD AN discovers that the UE is being handed over from the E-UTRAN to the HRPD network, the HRPD AN notifies the PDSN of creating data forwarding resources between the HRPD network and the E-UTRAN. This may be performed as follows:

1. The HRPD AN sends an All-Registration Request message to the PDSN. The HRPD AN adds an indication information element to the message to notify the PDSN of creating data forwarding resources between the HRPD network and the E-UTRAN. The indication information element may include:

E-UTRANH to HRPD handover indication.

Handover type: The HRPD AN sets this information element to "E-UTRAN to HRPD Handover".

Data forwarding type: The HRPD AN sets this information element to "E-UTRAN to HRPD Data Forwarding".

Cause: The HRPD AN sets this information element to "E-UTRAN to HRPD Handover".

The HRPD AN sets an "S" flag bit in the Flag information element to "True" or "1" to notify the PDSN that the cause is "PDSN fast handoff".

2. The HRPD AN sends a specific message, for example, All-Create Data Forwarding Tunnel Request, to notify the PDSN of creating data forwarding resources between the HRPD network and the E-UTRAN.

After receiving the preceding notification, the PDSN may return an All-Registration Reply message or an All-Create Data Forwarding Tunnel Response to the HRPD AN. The message returned by the PDSN carries the data forwarding address (also called an anchor P-P address) of the PDSN.

S608: The HRPD AN sends an S101 HO Command (HRPD TCA) message to the MME, where the message carries the data forwarding address of the PDSN.

S609: If the MME discovers that the UE is being handed over from the E-UTRAN to the HRPD network, the MME chooses a serving GW that the UE is using or selects a serving GW that can forward data between the E-UTRAN and the HRPD network. Then, the MME notifies the selected serving GW of creating data forwarding resources between the HRPD network and the E-UTRAN. This may be performed as follows:

1. The MME sends a Create Bearer Request message to the serving GW. The MME adds an indication information element to this message to notify the serving GW of creating data forwarding resources between the HRPD network and the E-UTRAN. The indication information element may include:

E-UTRAN to HRPD handover indication.

Handover type: The MME sets this information element to "E-UTRAN to HRPD Handover".

Data forwarding type: The MME sets this information element to "E-UTRAN to HRPD Data Forwarding".

Cause: The MME sets this information element to "E-UTRAN to HRPD Handover".

2. The MME sends a specific message, for example, Create Data Forwarding Tunnel Request, to notify the serving GW of creating data forwarding resources between the HRPD network and the E-UTRAN.

The message sent by the MME to the serving GW carries the data forwarding address of the PDSN. Subsequently, the serving GW forwards received packets to the PDSN associated with the data forwarding address.

After receiving the preceding message, the serving GW creates data forwarding resources between the HRPD network and the E-UTRAN (data forwarding resources between the serving GW and the PDSN and between the serving GW and the eNodeB). Then, the serving GW returns a Create Bearer Response or Create Data Forwarding Tunnel Response message (a serving GW address and a serving GW TEID) to the MME. The serving GW address and the serving GW TEID are data forwarding tunnel information allocated by the serving GW. The eNodeB forwards the cached downlink packets to the allocated data forwarding tunnel.

The serving GW may start a timer, and release established data forwarding tunnel resources after the timer times out.

S610: The MME sends an S1-AP message "Relocation Command" (including a HRPD TCA, the serving GW Address, and the serving GW TEID) to the eNodeB.

S611: After receiving this message, the eNodeB sends an HO Command message to the UE to notify the UE of handover, where the message carries an HRPD TCA message.

The eNodeB forwards its cached downlink packets to the serving GW. After receiving the downlink packets forwarded by the eNodeB, the serving GW forwards the downlink packets to the PDSN through the established P-P connection. For the serving GW, the P-P interface uses the GRE protocol; the interface between the serving GW and the eNodeB uses the GTP protocol. The forwarded packets that the serving GW receives from the eNodeB are in GTP format. Thus, the serving GW needs to convert the formats of the forwarded packets from GTP into GRE.

S612: The UE is handed over to the HRPD access network, and executes a traffic channel acquisition program.

S613: The UE sends an HRPD Traffic Channel Complete (TCC) message to the HRPD AN.

S614: The HRPD AN notifies the PDSN that the UE is handed over to a target network. The PDSN needs to notify the PDN GW of updating the downlink data route. This may be performed as follows:

1. The HRPD AN sends an All-Registration Request message to the PDSN. The HRPD AN adds an indication information element to notify the PDSN UE of successful handover to the target network. The PDSN needs to notify the PDN GW of updating the downlink data path. The indication information element may include:

Handover complete indication.

Handover type: The HRPD AN sets this information element to "Handover Complete".

Cause: The HRPD AN sets this information element to "Handover Complete".

The HRPD AN sets an "S" flag bit of the Flag information element in the All-Registration Request message to "False" or "0".

2. The HRPD AN sends a specific message, for example, All-Handover Complete, to notify the PDSN UE of successful handover to the target network. The PDSN needs to notify the PDN GW of updating the downlink data path.

S615: After receiving the preceding notification, the PDSN sends a Proxy BU message to the PDN GW.

S616: The PDSN returns an All-Registration Reply or All-Handover Complete Acknowledge message to the HRPD AN.

S617: The source E-UTRAN or EPS releases resources.

S618: The MME may initiate a "Delete Bearer Request" process to notify the serving GW of deleting the created forwarding tunnel resources.

For the data forwarding in the case of handover between heterogeneous networks with a single APN and multiple PDN connections, S608 is as follows: The HRPD AN sends an S101 HO Command message (HRPD TCA) to the MME, where the message carries the data forwarding address of the PDSN and PDN connection information.

S609: If the MME discovers that the UE is being handed over from the E-UTRAN to the HRPD network, the MME chooses the serving GW that the UE is using or selects a serving GW that can forward data between the E-UTRAN and the HRPD network. Then, the MME notifies the selected serving GW of creating data forwarding resources between the HRPD network and the E-UTRAN. The notification message sent by the MME to the serving GW carries the data forwarding address of the PDSN and PDN connection information. Subsequently, the serving GW forwards the received packets to a PDSN associated with the data forwarding address of the PDSN.

Figure 7A:
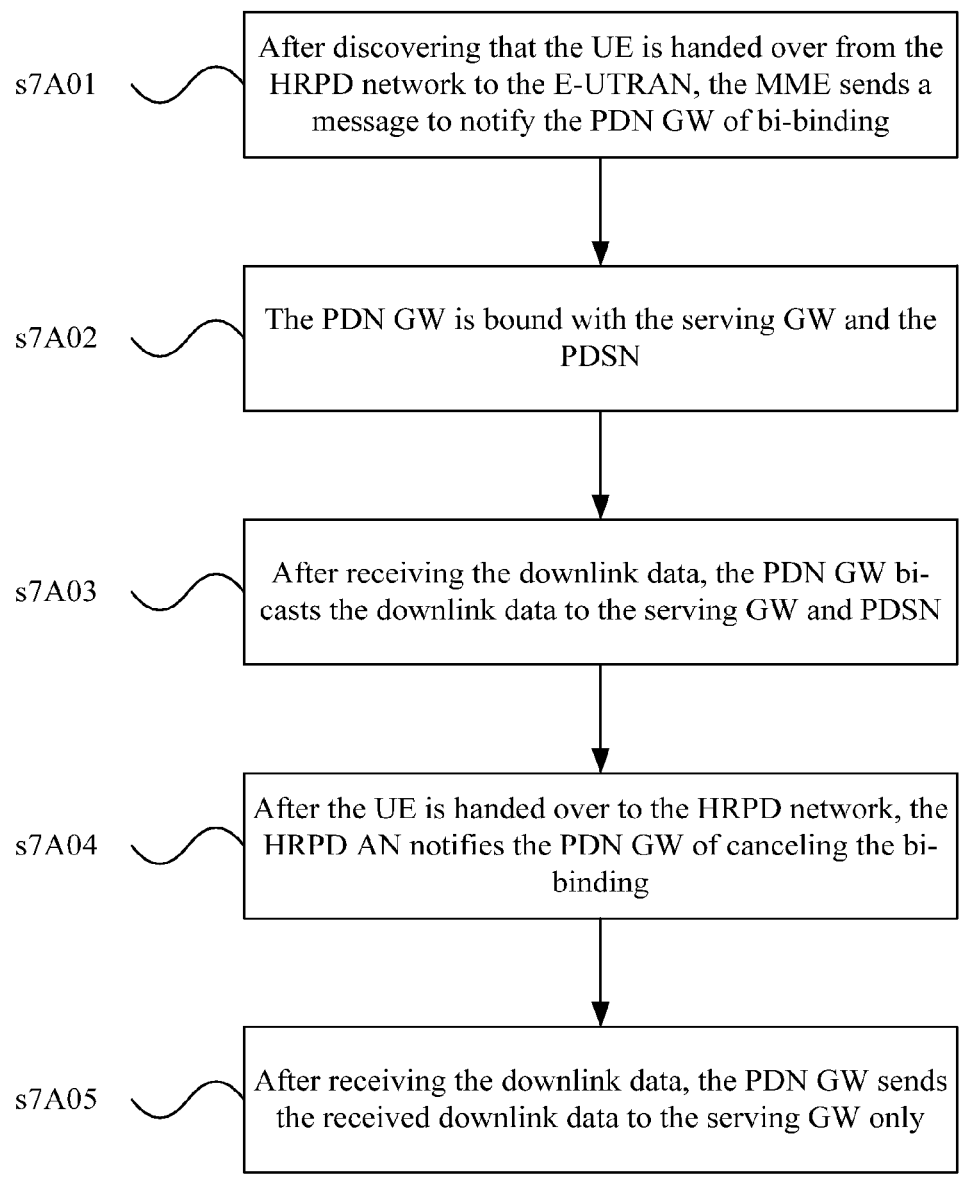
FIG. 7A shows a process of handover from an HRPD network to an E-UTRAN through a bi-casting method provided in a third embodiment of the present invention.

After receiving the preceding message, the serving GW creates data forwarding resources between the HRPD network and the E-UTRAN (data forwarding resources between the serving GW and the PDSN and between the serving GW and the eNodeB). For each PDN connection, the serving GW creates a GRE tunnel between the serving GW and the PDSN. Subsequently, the serving GW forwards the received packets in this PDN connection to the PDSN through the GRE tunnel The process of handover from an HRPD network to an E-UTRAN through a bi-casting method is described in the third embodiment of the present invention. Herein, the target network is an E-UTRAN; the source network is an HRPD network; the first NE of the target network is an MME; the second NE of the target network is an S-GW; and the user plane anchor point NE is a PDN GW. As shown in FIG. 7A, the process includes the following steps:

S7A01: After discovering that the UE is handed over from the HRPD network to the E-UTRAN, the MME sends a message to notify the PDN GW of bi-binding.

S7A02: The PDN GW is bound with the serving GW and the PDSN.

S7A03: After receiving downlink data, the PDN GW bi-casts the downlink data to the serving GW and PDSN.

S7A04: After the UE is handed over to the E-UTRAN, the MME notifies the PDN GW of canceling the bi-binding.

S7A05: After receiving the downlink data, the PDN GW sends the received downlink data to the serving GW only.

Figure 7B:
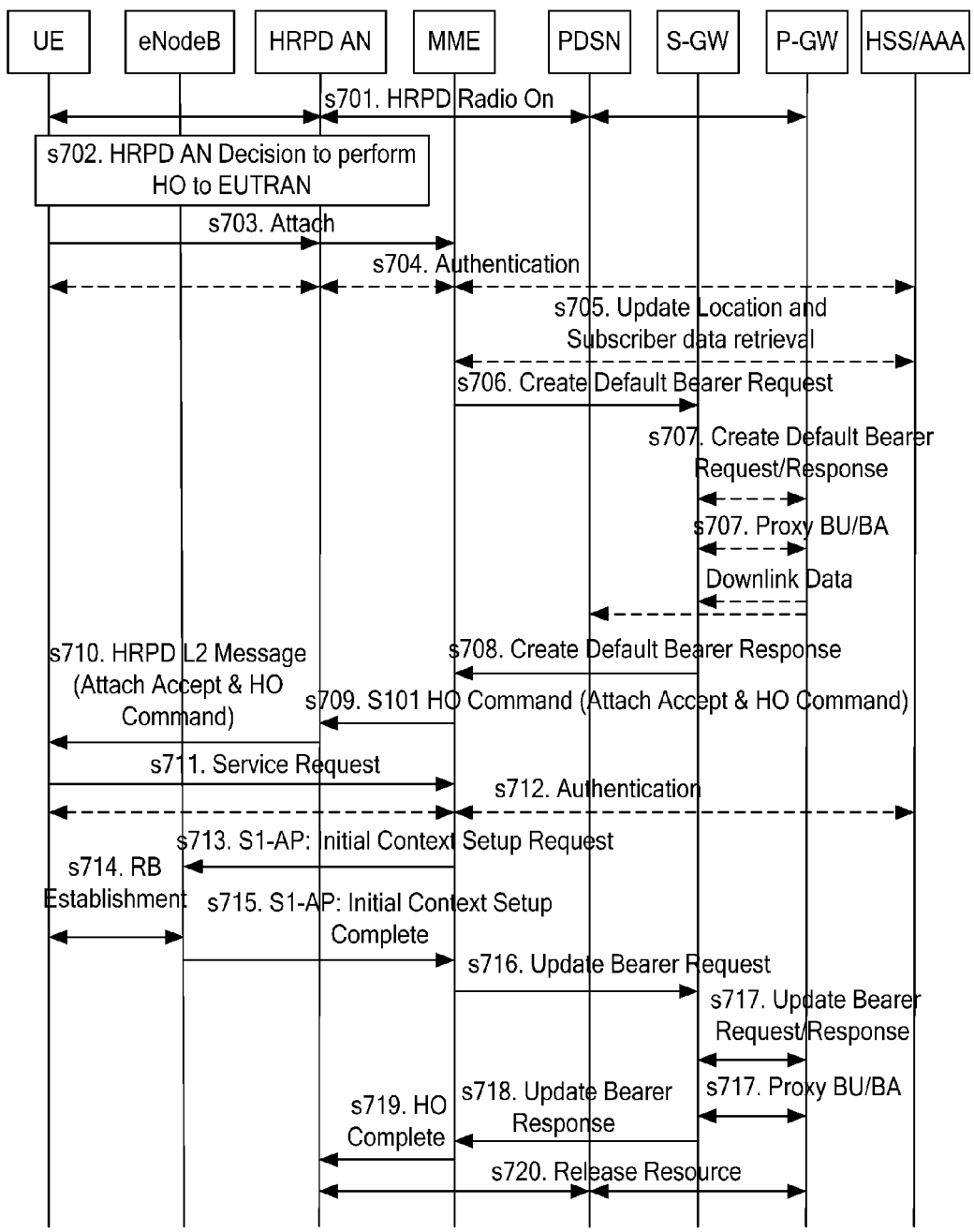
FIG. 7B shows a signaling process of handover from an HRPD network to an E-UTRAN through the bi-casting method provided in the third embodiment of the present invention.

The handover signaling process associated with the preceding process in the network scenario is shown in FIG. 7B, and includes the following steps:

S701: The UE accesses the HRPD network.

S702: The UE or the HRPD AN determines to perform handover from the HRPD network to the E-UTRAN.

S703: The UE sends an Attach Request message to the MME through the HRPD network.

S704: Authentication is performed.

S705: The MME sends an Update Location message to the HSS to obtain the subscription data of the UE. The HSS returns the subscription data of the UE, including address information of the PDN GW used by the UE.

S706: The MME selects a serving GW, and sends a Create Default Bearer Request message to the serving GW. The MME adds an indication information element to the Create Default Bearer Request message to notify the serving GW of the cause of the request message or notify subsequent NEs of how to process the request message. The indication information element may include:

HRPD to E-UTRAN handover indication or 3GPP to non-3GPP handover indication.

Handover type: The MME sets this information element to "HRPD to E-UTRAN Handover" or "non-3GPP to 3GPP Handover".

Cause: The MME sets this information element to "HRPD to E-UTRAN Handover" or "non-3GPP to 3GPP Handover".

Bi-casting indication: The MME notifies subsequent NEs of the need to perform bi-casting through this information element.

S707: If the interface between the serving GW and the PDN GW uses the GTP protocol, the serving GW sends a Create Default Bearer Request message to the PDN GW. The serving GW adds an indication information element to the Create Default Bearer Request message to notify the PDN GW of the cause of the request message or how to process the request message. The indication information element may include:

HRPD to E-UTRAN handover indication or non-3GPP to 3GPP handover indication.

Handover type: The serving GW sets this information element to "HRPD to E-UTRAN Handover" or "non-3GPP to 3GPP Handover".

Cause: The serving GW sets this information element to "HRPD to E-UTRAN Handover" or "non-3GPP to 3GPP Handover".

Bi-casting indication: The serving GW notifies the PDN GW of the need to perform bi-casting through this information element.

If the interface between the serving GW and the PDN GW uses the PMIP protocol, the serving GW sends a Proxy BU message to the PDN GW. The serving GW adds an indication information element to the Proxy BU message to notify the PDN GW of the cause of the BU message or how to process the BU message. The indication information element may include:

HRPD to E-UTRAN handover indication or non-3GPP to 3GPP handover indication.

Handover type: The serving GW sets this information element to "HRPD to E-UTRAN Handover" or "non-3GPP to 3GPP Handover".

Cause: The serving GW sets this information element to "HRPD to E-UTRAN Handover" or "non-3GPP to 3GPP Handover".

Bi-casting indication: The serving GW notifies the PDN GW of the need to perform bi-casting through this information element.

The serving GW sets an "S" flag bit in the Proxy BU message to notify the PDN GW of bi-binding.

After receiving the message from the serving GW, the PDN GW adds a BU or a bearer context and retains the resources in the source HRPD. After receiving downlink data, the PDN GW bi-casts the received downlink data in the source HRPD network and target E-UTRAN. The PDN GW may start a timer, and cancel the bi-casting mechanism and release the resources in the source HRPD network after the timer times out.

S708: The serving GW returns a Create Default Bearer Response message to the MME.

S709: The MME sends an S101 HO Command message to the HRPD AN, where the message includes an Attach Accept message and an HO Command message.

S7010: The HRPD AN sends an HRPD AN L2 message to the UE, where the message includes an Attach Accept message and an HO Command message.

S711: The UE is handed over to the E-UTRAN, and sends a Service Request message to the MME.

S712: Authentication may be performed.

S713: The MME sends an S1-AP: Initial Context Setup Request to the eNodeB.

S714: The eNodeB initiates a RB setup process.

S715: The eNodeB returns an S1-AP: Initial Context Setup Complete message to the MME.

S716: The MME sends an Update Bearer Request message to the serving GW. The MME may add an indication information element to this message to notify the serving GW of the cause of this message or how to process this message. The indication information element may include:

Handover complete indication.

Handover type: The MME sets this information element to "Handover Complete".

Update type: The MME sets this information element to "User Plane Path Switch" or "Cancel Bi-casting".

Cause: The MME sets this information element to "Handover Complete", "User Plane Path Switch" or "Cancel Bi-casting".

Cancel bi-casting indication: The MME notifies subsequent NEs of canceling the bi-casting through this information element.

Through the preceding indication information element, the MME notifies the serving GW that the bearer update request is caused by the handover of the UE to the target network or notifies the serving GW of the need to switch the user plane path. This flag bit is optional.

S707: If the interface between the serving GW and the PDN GW uses the GTP protocol, the serving GW sends an Update Bearer Request message to the PDN GW. The serving GW may add an indication information element to this message to notify the PDN GW of the cause of this message or how to process this message. The indication information element may include:

Handover complete indication.

Handover type: The serving GW sets this information element to "Handover Complete".

Update type: The serving GW sets this information element to "User Plane Path Switch" or "Cancel Bi-casting".

Cause: The serving GW sets this information element to "Handover Complete", "User Plane Path Switch" or "Cancel Bi-casting".

Cancel bi-casting indication: The serving GW notifies the PDN GW of canceling the bi-casting through this information element.

Through the preceding indication information element, the serving GW notifies the PDN GW that the bearer update request is caused by the handover of the UE to the target network or notifies the PDN GW of the need to switch the user plane path. This flag bit is optional.

If the interface between the serving GW and the PDN GW uses the PMIP protocol, the serving GW sends a Proxy BU message to the PDN GW. The serving GW may add an indication information element to this message to notify the PDN GW of the cause of this message or how to process this message. The indication information element may include:

Handover complete indication.

Handover type: The serving GW sets this information element to "Handover Complete".

Update type: The serving GW sets this information element to "User Plane Path Switch" or "Cancel Bi-casting".

Cause: The serving GW sets this information element to "Handover Complete", "User Plane Path Switch" or "Cancel Bi-casting".

Cancel bi-casting indication: The serving GW notifies the PDN GW of canceling the bi-casting through this information element.

The serving GW clears the "S" flag bit in the Proxy BU message to notify the PDN GW of canceling the binding of the source network.

Through the preceding indication information element, the serving GW notifies the PDN GW that the BU message is caused by the handover of the UE to the target network or notifies the PDN GW of the need to switch the user plane path. This flag bit is optional.

After receiving the preceding message, the PDN GW cancels the data bi-casting mechanism and routes the downlink data to the serving GW. After receiving the downlink data, the PDN GW sends the received downlink data to the serving GW only.

S708: The serving GW returns an Update Bearer Response message to the MME.

S719: The MME sends an HO Complete message to the HRPD AN to notify the HRPD AN of the completion of the handover.

S720: The PDN GW initiates a release process at the source HRPD network.

Figure 8A:
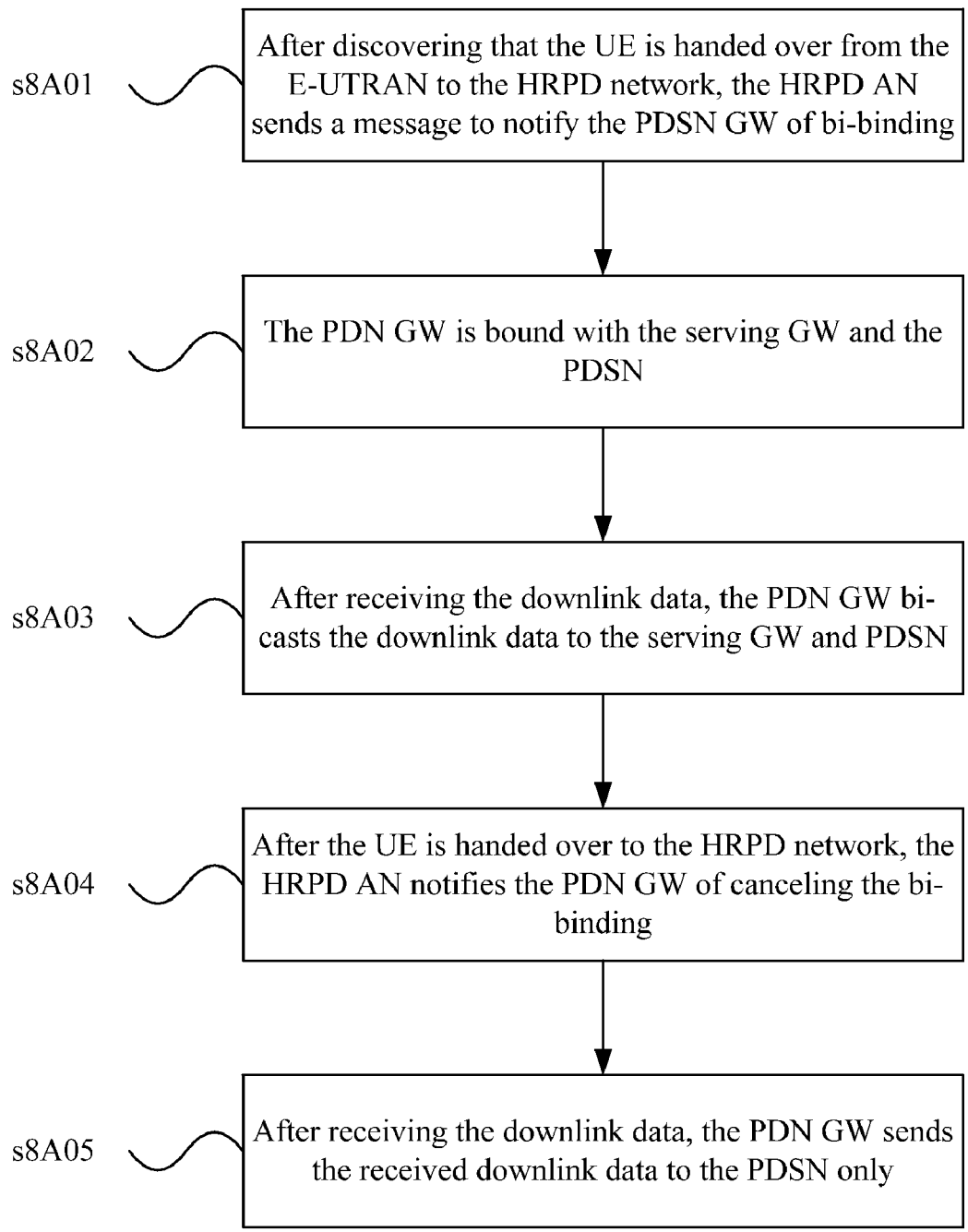
FIG. 8A shows a process of handover from an E-UTRAN to an HRPD network through the bi-casting method provided in the third embodiment of the present invention.

The process of handover from an E-UTRAN to an HRPD network through a bi-casting method is also described in the third embodiment of the present invention. Herein, the target network is an HRPD network; the source network is an E-UTRAN; the first NE of the target network is an HRPD AN; the second NE of the target network is a PDSN; and the user plane anchor point NE is a PDN GW. As shown in FIG. 8A, the process includes the following steps:

S8A01: After discovering that the UE is handed over from the E-UTRAN to the HRPD network, the HRPD AN sends a message to notify the PDN GW of bi-binding.

S8A02: The PDN GW is bound with the serving GW and the PDSN.

S8A03: After receiving downlink data, the PDN GW bi-casts the downlink data to the serving GW and PDSN.

S8A04: After the UE is handed over to the HRPD network, the HRPD AN notifies the PDN GW of canceling the bi-binding.

S8A05: After receiving the downlink data, the PDN GW sends the received downlink data to the serving GW only.

Figure 8B:
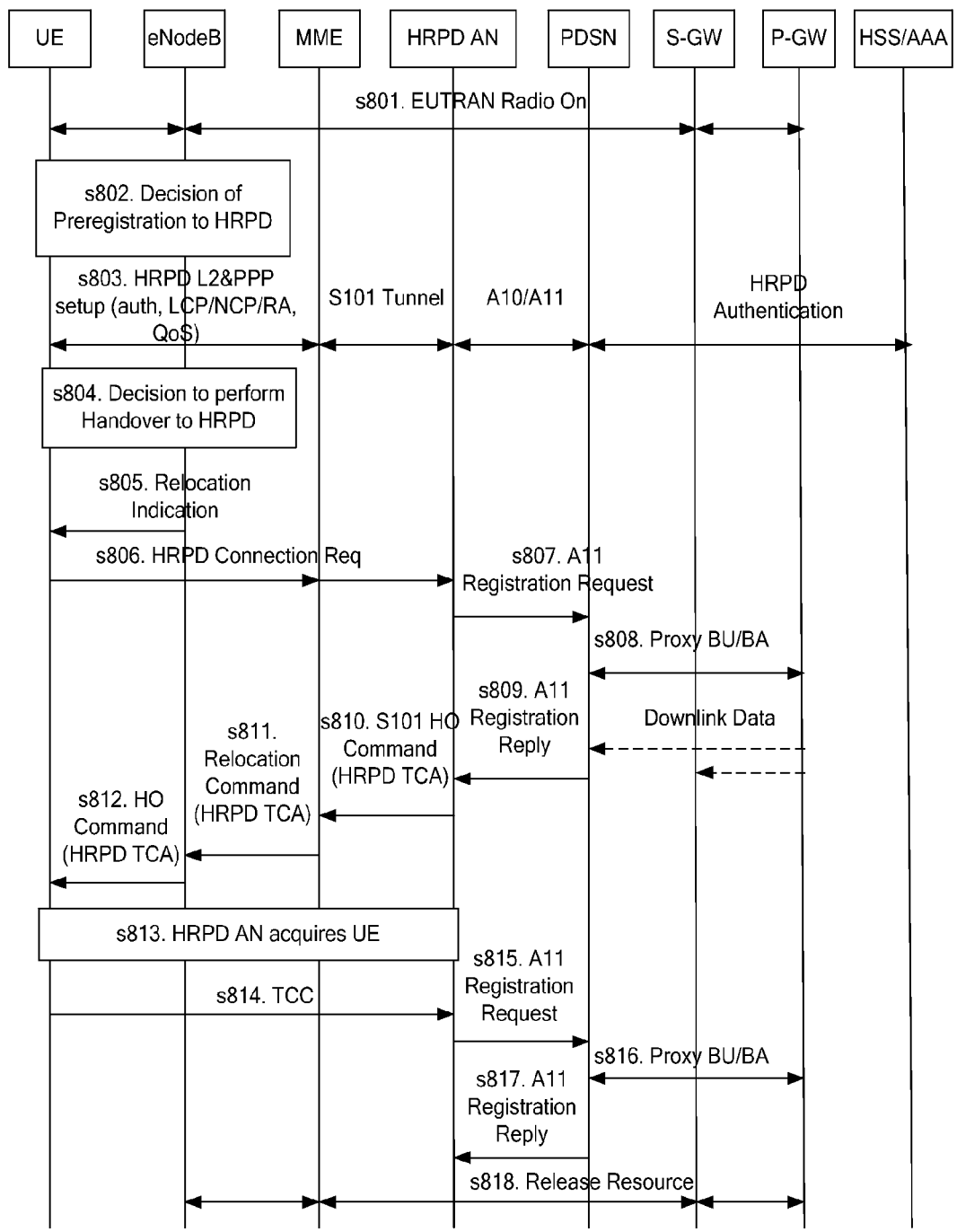
FIG. 8B shows a signaling process of handover from an E-UTRAN to an HRPD network through the bi-casting method provided in the third embodiment of the present invention.

The handover signaling process associated with the preceding process in the network scenario is shown in FIG. 8B, and includes the following steps:

S801: The UE accesses the E-UTRAN.

S802: The UE or the eNodeB determines to register with the HRPD network.

S803: The UE executes a particular program in the HRPD AN to establish an IP service connection with the PDSN and perform authentication in the HRPD AN.

S804: The UE or the eNodeB determines to perform handover from the E-UTRAN to the HRPD network.

S805: The eNodeB sends a Relocation Indication message to the UE to notify the UE of handover.

S806: The UE sends an HRPD Connection Request message to the HRPD AN. The HRPD AN allocates radio resources, and activates the PDSN session.

S807: The HRPD AN sends an All-Registration Request message to the PDSN. The HRPD AN adds an indication information element to this message to notify the PDSN of the cause of this registration request or how to process this registration request. The indication information element may include:

E-UTRAN to HRPD handover indication or 3GPP to non-3GPP handover indication.

Handover type: The HRPD AN sets this information element to "E-UTRAN to HRPD Handover" or "3GPP to non-3GPP Handover".

Cause: The HRPD AN sets this information element to "E-UTRAN to HRPD Handover" or "3GPP to non-3GPP Handover".

Bi-casting indication: The HRPD AN notifies subsequent NEs of the need to perform bi-casting through this information element.

The HRPD AN sets the "S" flag bit of the Flag information element in the All-Registration Request message to "True" or "1" to notify the PDSN that this registration request is caused by PDSN fast handoff.

S808: After receiving the All-Registration Request message, the PDSN sends a Proxy BU message to the PDN GW if the PDSN discovers that this registration request is caused by handover or that the subsequent NEs need to perform bi-casting. The PDSN may add an indication information element to this message to notify the PDN GW of the cause of this BU message or how to process this BU message. The indication information element may include:

E-UTRAN to HRPD handover indication or 3GPP to non-3GPP handover indication.

Handover type: The PDSN sets this information element to "E-UTRAN to HRPD Handover" or "3GPP to non-3GPP Handover".

Cause: The PDSN sets this information element to "E-UTRAN to HRPD Handover" or "3GPP to non-3GPP Handover".

Bi-casting indication: The PDSN notifies subsequent NEs of the need to perform bi-casting through this information element.

The PDSN sets the "S" flag bit in the Proxy BU message to notify the PDN GW of bi-binding.

After receiving the preceding notification, the PDN GW adds a BU, and retains resources in the source E-UTRAN. After receiving downlink data, the PDN GW bi-casts the downlink data in the source E-UTRAN and target HRPD network. The PDN GW may start a timer, cancel the bi-casting mechanism and release resources in the source E-UTRAN after the timer times out.

S809: The PDSN returns an A11-Registration Reply message to the HRPD AN.

S810: The HRPD AN sends an S101 HO Command message (HRPD TCA) to the MME.

S811: The MME sends an S1-AP message "Relocation Command" (HRPD TCA) to the eNodeB.

S812: After receiving this message, the eNodeB sends an HO Command message to the UE to notify the UE of handover, where the HO Command message carries an HRPD TCA message.

S813: The UE is handed over to the HRPD AN and executes a traffic channel acquisition program.

S814: The UE sends an HRPD Traffic Channel Complete (TCC) message to the HRPD AN.

S815: The HRPD AN sends an A11-Registration Request message to the PDSN. The HRPD AN adds an indication information element to this registration request message to notify the PDSN that this registration request is caused by the handover of the UE to the target network and the PDSN needs to notify the PDN GW of updating the downlink data route. The indication information element may include:

Handover complete indication.

Handover type: The HRPD AN sets this information element to "Handover Complete".

Update type: The HRPD AN sets this information element to "User Plane Path Switch" or "Cancel Bi-casting".

Cause: The HRPD AN sets this information element to "Handover Complete", "User Plane Path Switch" or "Cancel Bi-casting".

Cancel bi-casting indication: The HRPD AN notifies subsequent NEs of canceling bi-casting through this information element.

The HRPD AN sets the "S" flag bit of the Flag information element in the All-Registration Request to "False" or "0".

Through the preceding indication information element, the HRPD AN notifies the PDSN UE of successful handover to the target network or the need to switch the user plane path. This flag bit is optional.

S816: After receiving the A11-Registration Request message, the PDSN sends a Proxy BU message to the PDN GW if the PDSN discovers that this registration request is caused by the handover of the UE to the HRPD network or discovers that the user plane path needs to be switched. The PDSN may add an indication information element to this registration request message to notify the PDN GW of the cause of this BU message or how to process this BU message. The indication information element may include:

Handover complete indication.

Handover type: The PDSN sets this information element to "Handover Complete".

Update type: The PDSN sets this information element to "User Plane Path Switch" or "Cancel Bi-casting".

Cause: The PDSN sets this information element to "Handover Complete", "User Plane Path Switch" or "Cancel Bi-casting".

Cancel bi-casting indication: The PDSN notifies subsequent NEs of canceling bi-casting through this information element.

The PDSN clears the "S" flag bit in the Proxy BU message to notify the PDN GW of canceling the bi-binding (that is, canceling the binding in the source network).

Through the preceding indication information element, the PDSN notifies the PDSN GW that the UE is handed over to the target network or the need to switch the user plane path or to cancel the bi-casting. This flag bit is optional.

After receiving the preceding message, the PDN GW cancels the data bi-casting mechanism and routes the downlink data to the PDSN. After receiving the downlink data, the PDN GW sends the received downlink data to the PDSN only.

S817: The PDSN returns an All-Registration Reply message to the HRPD AN.

S818: The source E-UTRAN or EPS releases resources.

Embodiments of the present invention provide a lossless data processing method in the case of handover between heterogeneous networks. This method overcomes the problem of data loss during the handover between heterogeneous networks in the existing technology by using a data forwarding method or a bi-casting method, reduces the duration of user service interruption and enhances the user experience.

Figure 9:
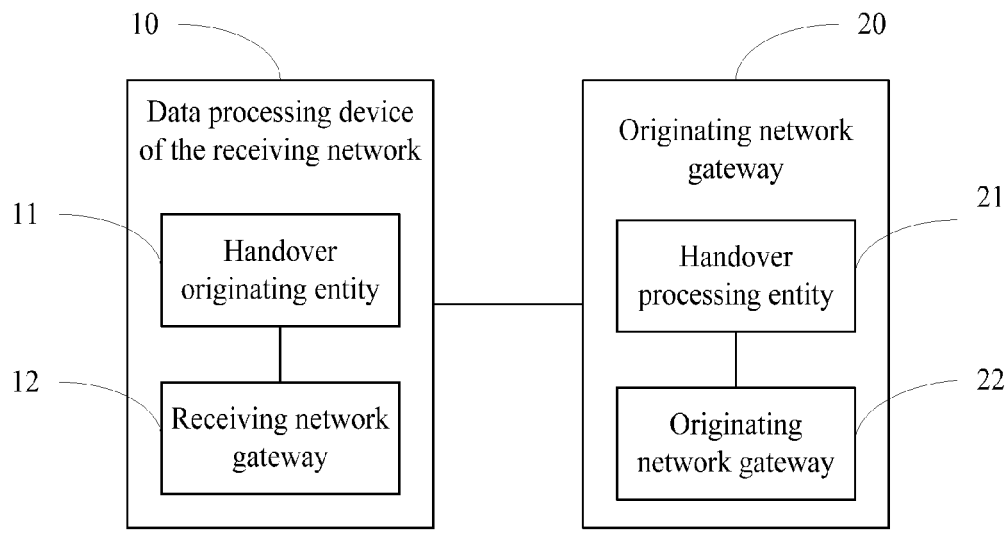
FIG. 9 shows a data processing system provided in a fourth embodiment of the present invention.

A data processing system is provided in the fourth embodiment of the present invention, used for forwarding data in the case of handover between heterogeneous networks. As shown in FIG. 9, the data processing system includes a data processing device 10 of a target network and a data processing device 20 of a source network. The data processing device 10 of the target network is adapted to create a data forwarding address, and receive data from the data processing device 20 of a source network.

The data processing device 10 of the target network further includes: a handover source entity 11, adapted to: notify a gateway of the local network of creating a data forwarding address when detecting that a UE in a source network is handed over to the local network, and send the data forwarding address to the source network, where: when the local network is an HRPD network, the handover source entity 11 is located in an HRPD AN; when the local network is an E-UTRAN, the handover source entity 11 is located in an MME; and a gateway 12 of the target network, adapted to: create a data forwarding address when target the notification message from the handover source entity 11, notify the handover source entity 11 of the data forwarding address, and receive data from the source network.

The data processing device 20 of the source network further includes: a handover processing entity 21, adapted to: obtain a data forwarding address created in the target network when the UE in the local network is handed over to the target network, and send the data forwarding address to a gateway 22 of the source network, where: when the local network is an HRPD network, the handover processing entity 21 is located in the HRPD AN; when the local network is an E-UTRAN, the handover processing entity 21 is located in the MME; and the gateway 22 of the source network, adapted to: create a data forwarding tunnel between the gateway 22 of the source network and the gateway 12 of the target network according to the data forwarding address from the handover processing entity 21, and send data to the target network through the data forwarding tunnel.

Figure 10:
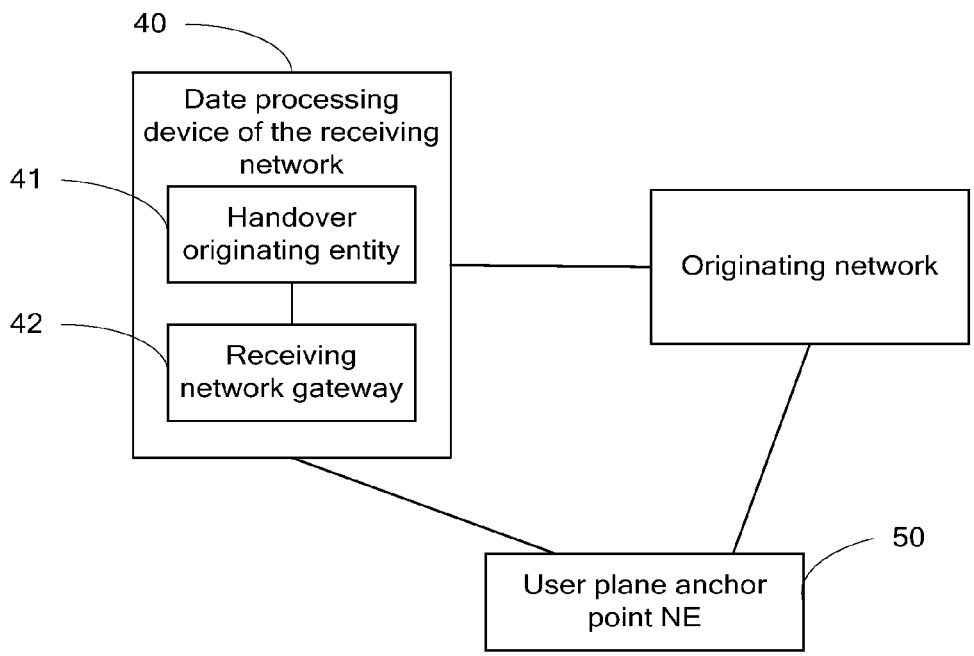
FIG. 10 shows a data processing system provided in a fifth embodiment of the present invention.

A data processing system is provided in the fifth embodiment of the present invention, used for forwarding data in the case of handover between heterogeneous networks. As shown in FIG. 10, the data processing system includes: a data processing device 40 of a target network, adapted to: notify a user plane anchor point NE 50 of bi-casting when detecting that a UE is handed over from a source network to the local network, and receive data from the user plane anchor point NE 50; and the user plane anchor point NE 50, adapted to: perform bi-casting in the target network and the source network according to the notification from the target network, and send data to the target network and the source network.

The data processing device 40 of the target network further includes: a handover source entity 41, adapted to notify a gateway 42 of the local network when detecting that the UE in the source network is handed over to the local network, where: when the local network is an HRPD network, the handover source entity is located in an HRPD AN; when the local network is an E-UTRAN, the handover source entity 11 is located in an MME; and the gateway 42 of the target network, adapted to: notify the user plane anchor point NE 50 of the target network and the source network when target the notification from the handover source entity 41; and receive data that the user plane anchor point NE 50 sends to the source network and the target network.

Through the system and device provided in preceding embodiments of the present invention, a lossless data processing method is provided in the case of handover between heterogeneous networks. This method overcomes the problem of data loss during the handover between heterogeneous networks in the existing technology by using a data forwarding method or a bi-casting method, reduces the duration of user service interruption and enhances the user experience.

Through the preceding description of embodiments of the present invention, it is understandable to those skilled in the art that embodiments of the present invention may be implemented by hardware or by software in combination with a necessary hardware platform. Thus, the technical solution of the present invention may be made into software. The software may be stored in a non-volatile storage medium (for example, a CD-ROM, a USB disk, and a mobile hard disk), and include several instructions that instruct a computer device (a personal computer, a server, or a network device) to perform the methods provided in each embodiment of the present invention.

Although the present invention has been described through several exemplary embodiments, the invention is not limited to such embodiments. It is apparent that those skilled in the art can make various modifications and variations to the invention without departing from the spirit and scope of the invention. The invention is intended to cover the modifications and variations provided that they fall in the scope of protection defined by the following claims or their equivalents.

I claim:

1. In a mobility management entity (MME), a method for mitigating data loss when a mobile device is handed over between two heterogeneous networks by creating data forwarding resources between a source network and a target network, the method comprising:
   receiving, during a handover process of a user equipment from a source network to a target network, a message from the target network that includes a data forwarding address of a serving node thereon;
   selecting a serving gateway within the source network;
   sending, to the serving gateway, a message that includes the data forwarding address of the serving node in the target network and requests the serving gateway to create data forwarding resources between the source and target networks according to the data forwarding address of the serving node;
   receiving a message including data forwarding tunnel information allocated by the serving gateway; and
   sending, to a first node on the source network, the data forwarding tunnel information for allowing packets cached to be forwarded to the serving gateway;
   wherein the first node on the source network is an eNodeB for forwarding packets during the handover process;
   wherein the received data forwarding tunnel information allocated by the serving gateway includes a serving gateway address and a serving gateway Tunnel Endpoint Identification (TEID); and
   wherein the eNodeB forwards cached downlink packets to the serving gateway according to the serving gateway address and the serving gateway TEID.

2. The method of claim 1, wherein the source network is an evolved UMTS terrestrial radio access (E-UTRAN) network, and the target network is a high rate packet data (HRPD) network.

3. The method of claim 2, wherein the serving node on the target network is a packet data service node (PSDN), which is a user plane processing network element in the HRPD network and is adapted to perform user plane processing in the HRPD network.

4. The method of claim 1, wherein the selected serving gateway within the source network is the serving gateway that the mobile device is using.

5. The method of claim 1, wherein the message from the target network further includes a packet data network (PDN) connection information, and the PDN connection information is sent to the serving gateway, and wherein the data forwarding resources between the source and target networks is created according to the data forwarding address of the serving node and the PDN connection information.

6. The method of claim 5, wherein the data forwarding resources between the source and target networks is created by creating a generic routing encapsulation (GRE) tunnel for each PDN connection for forwarding data between the source and target networks.

7. The method of claim 1, wherein the serving gateway starts a timer and releases the created data forwarding resources between the source and target networks when the time set in the timer is expired.

8. The computer program product of claim 1, wherein the message from the target network further includes a packet data network (PDN) connection information, and the PDN connection information is sent to the serving gateway, and wherein the data forwarding resources between the source and target networks is created according to the data forwarding address of the serving node and the PDN connection information.

9. In a mobility management entity (MME), in order to mitigate data loss when a mobile device is handed over between two heterogeneous networks by creating data forwarding resources between a source network and a target network, a computer program product stored on a non-transitory computer readable medium comprising computer executable instruction that when executed implement the following:
   receive, during a handover process of a user equipment from a source network to a target network, a message from the target network that includes a data forwarding address of a serving node thereon;
   select a serving gateway within the source network;
   send, to the serving gateway, a message that includes the data forwarding address of the serving node in the target network and requests the serving gateway to create data forwarding resources between the source and target networks according to the data forwarding address of the serving node;
   receive a message including data forwarding tunnel information allocated by the serving gateway; and send, to a first node on the source network, the data forwarding tunnel information for allowing packets cached to be forwarded to the serving gateway;

wherein the first node on the source network is an eNodeB for forwarding packets during the handover process;

wherein the received data forwarding tunnel information allocated by the serving gateway includes a serving gateway address and a serving gateway Tunnel Endpoint Identification (TEID); and wherein the eNodeB forwards cached downlink packets to the serving gateway according to the serving gateway address and the serving gateway TEID.

10. The computer program product of claim 9, wherein the source network is an evolved UMTS terrestrial radio access (E-UTRAN) network, and the target network is a high rate packet data (HRPD) network.

11. The computer program product of claim 10, wherein the serving node on the target network is a packet data service node (PSDN), which is a user plane processing network element in the HRPD network and is adapted to perform user plane processing in the HRPD network.

12. The computer program product of claim 9, wherein the selected serving gateway within the source network is the serving gateway that the mobile device is using.

13. In a serving gateway (S-GW), a method for mitigating data loss when a mobile device is handed over between two heterogeneous networks by creating data forwarding resources between a source network and a target network, the method comprising:

receiving, during a handover process of a user equipment from a source network to a target network, a message from the target network that includes a data forwarding address of a serving node thereon;

creating data forwarding resources between the source network and the target network according to the data forwarding address of the serving node;

sending a message including data forwarding tunnel information for allowing a first node on the source network to forward cached packets according to the data forwarding tunnel information;

wherein the first node on the source network is an eNodeB for forwarding cached packets during the handover process wherein the data forwarding tunnel information includes a serving gateway address and a serving gateway Tunnel Endpoint Identification (TEID); and wherein the eNodeB forwards cached downlink packets to the serving gateway according to the serving gateway address and the serving gateway TEID.

14. The method of claim 13, wherein the source network is an evolved UMTS terrestrial radio access (E-UTRAN) network, and the target network is a high rate packet data (HRPD) network.

15. The method of claim 14, wherein the serving node on the target network is a packet data service node (PSDN), which is a user plane processing network element in the HRPD network and is adapted to perform user plane processing in the HRPD network.

16. The method of claim 13, wherein the mobile device uses the serving gateway.

17. The method of claim 13, wherein the message from the target network further includes a packet data network (PDN) connection information, and wherein the data forwarding resources between the source and target networks are created according to the data forwarding address of the serving node and the PDN connection information.

18. The method of claim 17, wherein the data forwarding resources between the source and target networks is created by creating a generic routing encapsulation (GRE) tunnel for each PDN connection for forwarding data between the source and target networks.

19. The method of claim 13, further comprising: starting a timer and releasing the created data forwarding resources between the source and target networks when the time set in the timer is expired.

20. In a serving gateway (S-GW), in order to mitigate data loss when a mobile device is handed over between two heterogeneous networks by creating data forwarding resources between a source network and a target network, a computer program product stored on a non-transitory computer readable medium comprising computer executable instruction that when executed implement the following:

receive, during a handover process of a user equipment from a source network to a target network, a message from the target network that includes a data forwarding address of a serving node thereon;

create data forwarding resources between the source network and the target network according to the data forwarding address of the serving node;

send a message including data forwarding tunnel information for allowing a first node on the source network to forward cached packets according to the data forwarding tunnel information;

wherein the first node on the source network is an eNodeB for forwarding cached packets during the handover process wherein the data forwarding tunnel information includes a serving gateway address and a serving gateway Tunnel Endpoint Identification (TEID); and wherein the eNodeB forwards cached downlink packets to the serving gateway according to the serving gateway address and the serving gateway TEID.

21. The computer program product of claim 20, wherein the source network is an evolved UMTS terrestrial radio access (E-UTRAN) network, and the target network is a high rate packet data (HRPD) network.

22. The computer program product of claim 21, wherein the message from the target network further includes a packet data network (PDN) connection information, and wherein the data forwarding resources between the source and target networks are created according to the data forwarding address of the serving node and the PDN connection information.

23. The computer program product of claim 22, wherein the data forwarding resources between the source and target networks is created by creating a generic routing encapsulation (GRE) tunnel for each PDN connection for forwarding data between the source and target networks.

24. The computer program product of claim 20, further comprising computer executable instruction that when executed implement the following: starts a timer and releases the created data forwarding resources between the source and target networks when the time set in the timer is expired.

* * * * *